No. 698,704. Patented Apr. 29, 1902.
E. HART.
METHOD OF MAKING HYDROCHLORIC ACID.
(Application filed Nov. 5, 1901.)
(No Model.)
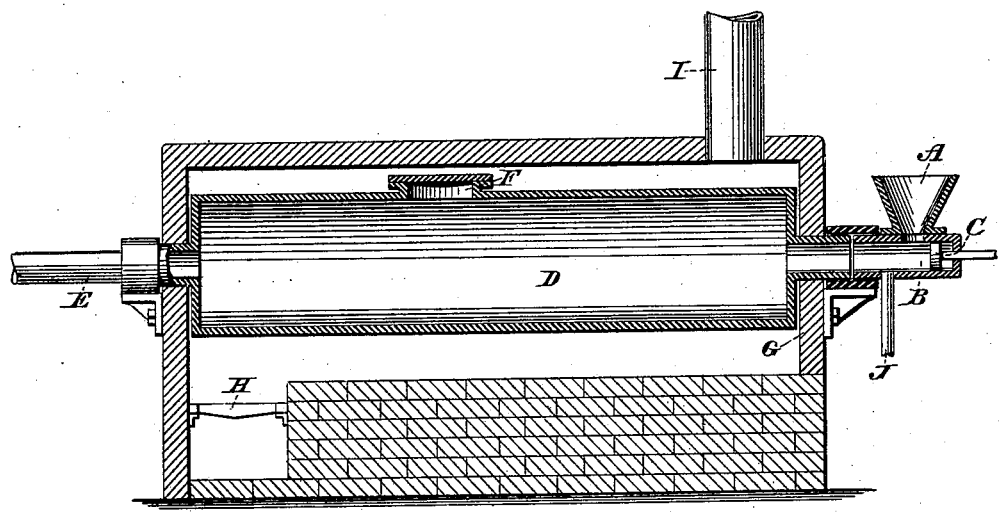
WITNESSES:
INVENTOR
Edward Hart
BY
his ATTORNEYS

UNITED STATES PATENT OFFICE.

EDWARD HART, OF EASTON, PENNSYLVANIA, ASSIGNOR TO GENERAL CHEMICAL COMPANY, OF NEW YORK, N. Y., A CORPORATION OF NEW YORK.

METHOD OF MAKING HYDROCHLORIC ACID.

SPECIFICATION forming part of Letters Patent No. 698,704, dated April 29, 1902.

Application filed November 5, 1901. Serial No. 81,171. (No specimens.)

*To all whom it may concern:*

Be it known that I, EDWARD HART, a citizen of the United States, residing at Easton, Northampton county, and State of Pennsylvania, have invented certain new and useful Improvements in the Manufacture of Hydrochloric Acid, of which the following is a specification.

My invention relates to the manufacture of hydrochloric acid from common salt or sodium chlorid and sodium pyrosulfate, whether this pyrosulfate of sodium be employed as raw material or obtained in the course of other reactions, as in the treatment of sodium chlorid with sulfuric acid.

I have discovered that when sodium pyrosulfate ($Na_2S_2O_7$) and common salt (NaCl) are mixed and heated no hydrochloric acid (HCl) is given off, but as the temperature rises to a red heat the sodium pyrosulfate is decomposed into sodium sulfate ($Na_2SO_4$) and sulfuric anhydrid or sulfur trioxid, ($SO_3$,) the salt undergoing no change. If, however, steam be passed over such a mixture of sodium pyrosulfate and sodium chlorid at a temperature below that at which the decomposition of the pyrosulfate occurs, both compounds will be decomposed and will react on each other to form hydrochloric acid and sodium sulfate, of which the latter is in proper condition to be used as a so-called "salt cake" in the manufacture of glass. The reaction may be expressed by the following equation:

I. $Na_2S_2O_7 + 2NaCl + H_2O = 2Na_2SO_4 + 2HCl$

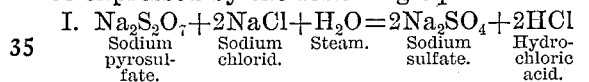

This decomposition and reaction is complete at a low temperature.

As stated at the beginning of this specification, I may take sodium pyrosulfate and salt as raw materials or I may employ processes in the course of which sodium pyrosulfate is formed. Thus if sodium chlorid and sulfuric acid are made to react upon each other according to the well-known procedure there are produced at first sodium hydrogen sulfate ($NaHSO_4$) and hydrochloric acid, (HCl,) while a portion of the salt remains unaltered. This is represented by the equation—

II. $8NaCl + 4H_2SO_4 = 4NaHSO_4 + 4HCl + 4NaCl$

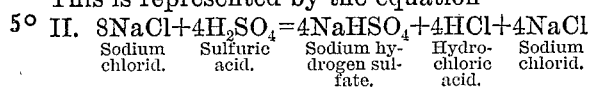

Sodium hydrogen sulfate and sodium chlorid react on each other and form hydrochloric acid and sodium sulfate, while the hydrochloric acid previously formed of course escapes as a gas. It is found, however, in practice that this reaction is not complete under ordinary circumstances—that is, only a portion of the sodium hydrogen sulfate and of the salt will react as just indicated, while another portion of said sodium hydrogen sulfate and of the salt will react to form sodium pyrosulfate and water, the salt remaining unaltered. Therefore after the first reaction has taken place according to equation II there will occur practically at the same time the following two reactions:

III. $2NaHSO_4 + 2NaCl = 2Na_2SO_4 + 2HCl$ and

IV. $2NaCl + 2NaHSO_4 = 2NaCl + Na_2S_2O_7 + H_2O$.

Equation III represents a final reaction showing the production of hydrochloric acid and sodium sulfate. Equation IV shows how the sodium pyrosulfate of which I have spoken at the beginning of this specification is produced in this particular case.

The compounds resulting from equation IV will react upon each other upon further heating in the manner expressed by equation I, which I will here repeat for the sake of clearness:

I. $Na_2S_2O_7 + 2NaCl + H_2O = 2Na_2SO_4 + 2HCl$.

We therefore find that from the sodium chlorid and the sulfuric acid which compose the left-hand side of equation II there are finally formed only hydrochloric acid and sodium sulfate.

While I have described a complete series of reactions, I desire it to be understood that I may start with equation I—that is, I may have the sodium pyrosulfate as one of the raw materials at the beginning.

Of course where I speak of the "completeness" of the reaction I mean that the reaction is a practically complete one and that the traces or remainder of common salt and of sulfuric acid which may be found in the final product will be very slight if the proper proportions of salt and sulfuric acid are used in the original mixture, as indicated by equation II, or in case I start from equation I the proportions of salt and pyrosulfate will have to be chosen accordingly to avoid as much as possible leaving a residuum of common salt. When the operation is started according to equation II and pure materials are employed, the proper proportions will be about ninety-eight pounds of sulfuric acid and one hundred and sixteen pounds of sodium chlorid.

With the process above outlined I obtain hydrochloric acid almost free from sulfuric acid and salt cake (sodium sulfate) practically free from common salt. When I start with equation II, I may carry out the entire series of reactions II, III, IV, and I in one vessel and practically at one operation. I find it preferable, however, in some cases to carry out the operation in two stages, the first stage involving equations II, III, and IV and the second stage being represented by equation I. The object in carrying out the operation in two stages is to properly pulverize and mix the sodium hydrogen sulfate or the sodium pyrosulfate with the common salt before the second stage of the operation.

One great advantage of my process is that it may be completed in closed vessels heated from the outside, the resulting hydrochloric-acid gas being pure and unmixed with air or the products of combustion, and consequently easier to condense.

It will therefore be understood that in my invention I first produce sodium pyrosulfate sometimes mixed with common salt and with sodium hydrogen sulfate. Then if the mixture does not contain any common salt in sufficient amount I add a proper quantity of such salt and pass steam in contact with the heated mixture to accomplish the reaction indicated under I.

The invention may be carried out by the aid of any suitable apparatus—for instance, the one shown in longitudinal section in the accompanying drawing.

A is the hopper for the introduction of the ground, wet, or dry mixture of sodium pyrosulfate or sodium hydrogen sulfate and salt into a tube B. C is a piston for feeding said material through said tube into the retort D, which may be a rotary one and has a connection at the other end with an outlet-pipe E for the escape of the hydrochloric acid formed. F is a manhole-cover for emptying the retort at the completion of the operation. G is a furnace or setting in which the retort D is supported. H is the grate, and I the chimney. Steam is admitted through a pipe J, which may be connected with the tube B. It will be understood that this apparatus is particularly intended for carrying out what I have termed the "second stage" of the process hereinbefore described—that is, a mixture of salt and sodium hydrogen sulfate or pyrosulfate prepared according to any approved method is introduced into the retort D and heated therein. The mixture will generally contain a certain amount of water, and it will be understood that the supply of steam may be varied according to the greater or smaller water contents of the mixture. It will be understood that the reaction begins at the feed end of the retort and gradually progresses in intensity toward the delivery end thereof, since the grate and combustion-chamber are arranged adjacent to the delivery end. Thus the gas liberated will pass over the nearly-finished salt cake, together with any water which results from the use of more or less wet salt, and, in the case I start with equation II, from the use of diluted sulfuric acid. The passing of the water-vapor over the nearly-finished salt cake or sodium sulfate I consider an important point of my invention.

As stated hereinbefore, I may carry out both stages—that is, the formation of sodium pyrosulfate and its decomposition in the presence of sodium chlorid—in a continuous apparatus of any appropriate construction. For instance, I might feed salt, sulfuric acid, and steam into one end of a cylinder or retort heated exteriorly and continuously remove from the other end of such cylinder or retort the hydrochloric acid and salt cake obtained by the reaction.

I claim as my invention—

1. The herein-described process of manufacturing hydrochloric acid, which consists in heating sodium pyrosulfate and sodium chlorid in the presence of water.

2. The herein-described process of producing hydrochloric acid which consists in causing to react upon each other at a temperature below red heat, sodium pyrosulfate, sodium chlorid, and water in substantially the proportion of two equivalents of sodium chlorid, one equivalent of water and one equivalent of sodium pyrosulfate.

3. The herein-described improvement in the manufacture of hydrochloric acid which consists in subjecting a mixture of sodium pyrosulfate, sodium chlorid and water to a temperature increasing gradually from one portion of the mixture to another, thus causing the gas liberated to pass over the nearly-finished salt cake which results from the reaction together with the hydrochloric acid.

4. The herein-described improvement in the manufacture of hydrochloric acid which consists in heating a mixture of sodium chlorid and sulfuric acid, to cause the formation of sodium hydrogen sulfate and sodium pyrosulfate, and continuing to heat the mixture to a temperature below red heat in the presence of water or steam, to cause the production of hydrochloric acid and salt cake or sodium sulfate.

EDWARD HART.

Witnesses:
HARVEY T. DENGLER,
WILLIAM A. KILIAN.